June 22, 1948. P. G. STULTZ 2,443,931
CAR END STRAIGHTENER ADJUSTING TRUCK
Filed April 9, 1946 3 Sheets-Sheet 1
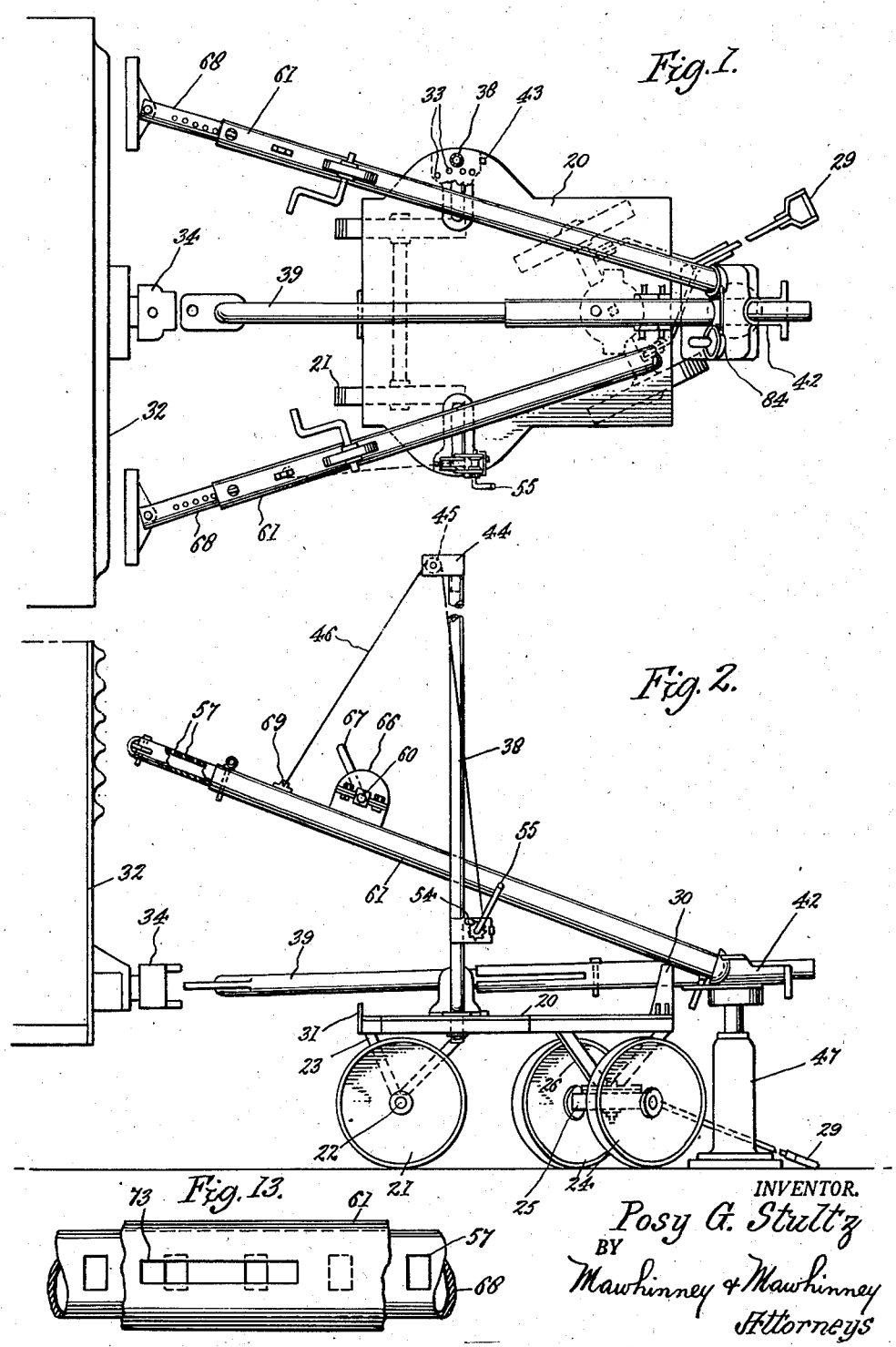
INVENTOR.
Posy G. Stultz
BY
Mawhinney & Mawhinney
Attorneys June 22, 1948. P. G. STULTZ 2,443,931
CAR END STRAIGHTENER ADJUSTING TRUCK
Filed April 9, 1946 3 Sheets-Sheet 2
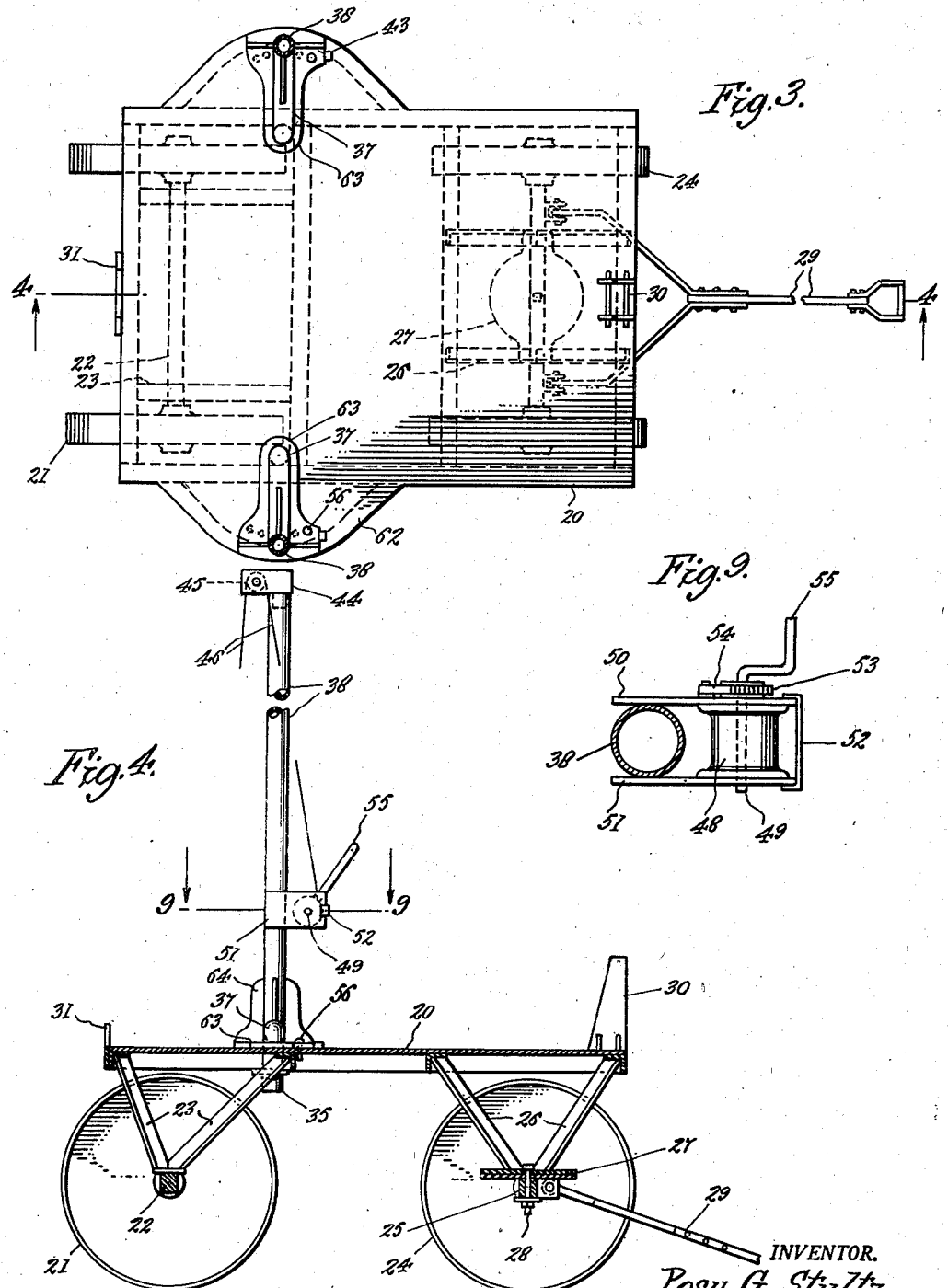
INVENTOR.
Posy G. Stultz
BY Mawhinney & Mawhinney
Attorneys

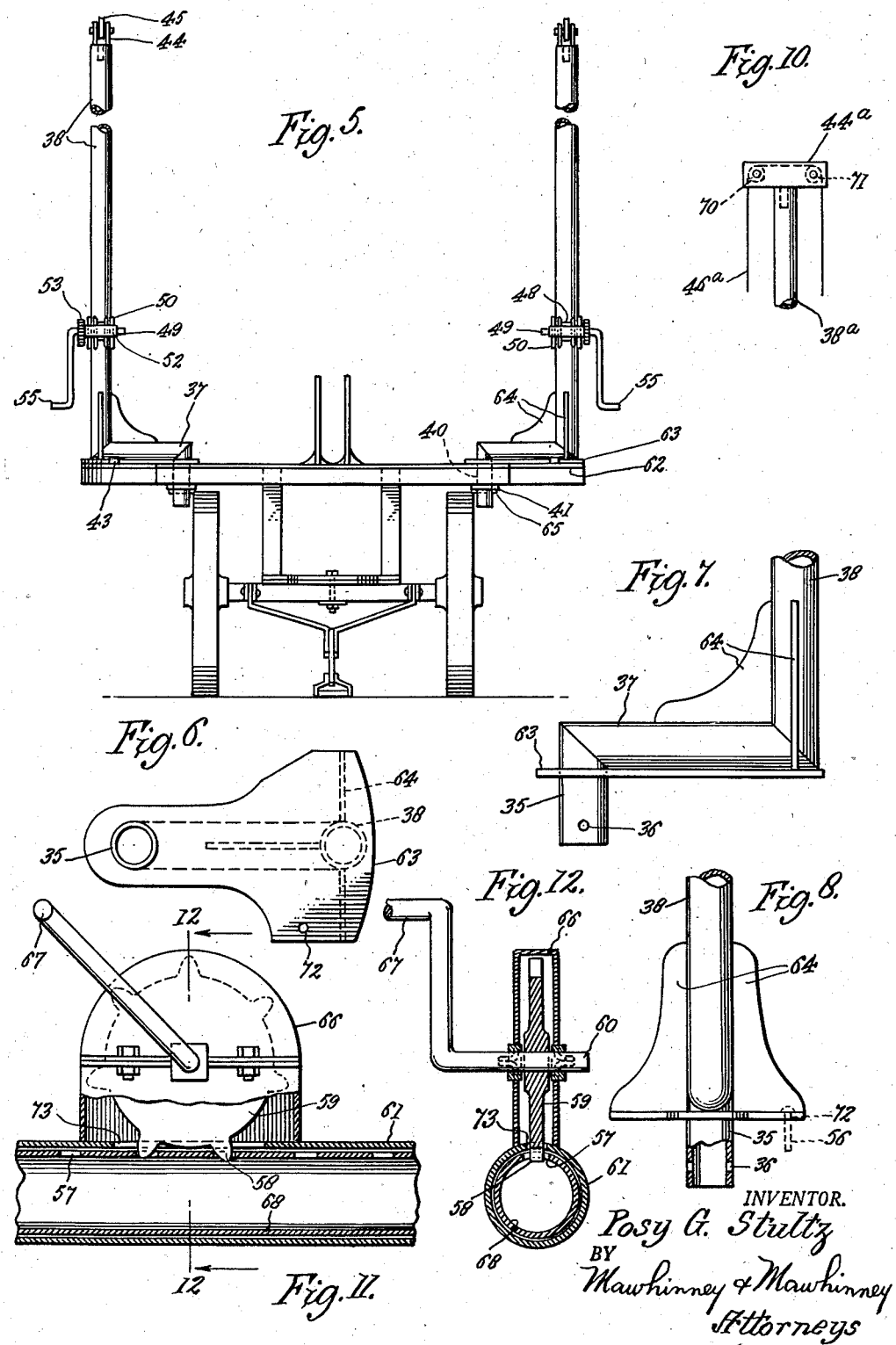

Patented June 22, 1948

2,443,931

UNITED STATES PATENT OFFICE 2,443,931

CAR END STRAIGHTENER ADJUSTING TRUCK

Posy G. Stultz, Roanoke, Va., assignor to Charles M. O'Boyle, Wilmington, Del.

Application April 9, 1946, Serial No. 660,777

15 Claims. (Cl. 153—38)

The present invention relates to improvements in car end straightener adjusting trucks and has for an object to provide a truck for supporting and transporting from place to place and for adjusting to freight car ends or other sheets to be straightened the car end straightener which is the subject matter of my prior Patent No. 2,371,659, granted March 22, 1945.

The invention constitutes certain improvements over the pending application of John D. Prilliman for adjusting and operating trucks for car end straighteners, Serial No. 600,350, filed June 19, 1945.

An object of the invention is to provide an improved truck designed to conveniently receive and support a car end straightener of the type disclosed in my prior patent aforesaid in such fashion and manner that the tension and compression arms overhang the front and rear ends of the truck in position to engage the car end or side and also the lifting jack or other hoisting agent, with such arms in such elevated position that the free end of the tension arm is supported in readiness to be attached to the coupler of the car or to a clamp device attached to the side of the car and with the jacking head of the car end straightener projecting from the front end of the truck to enable a hoisting or lifting jack to be placed beneath the jacking head; whereby the car end straightener may always be operated from the truck which relieves workmen from the onus of carrying the device to the site of operations and incidentally dispenses with a greater number of men, most of them skilled, than two skilled operatives who are enabled without loss of time and conveniently to pull the truck to the locus of operations and with a minimum of labor and in a minimum of time couple the device to the car and jack up the straightener to cause it to perform its straightening operation upon the car sheets.

Another object of the invention is to provide an improved truck of the character described in which provision is made for adjusting the two compression arms of the straightener device both vertically and horizontally; and in this connection a novel feature is introduced into the telescoping members of the compression arms by which those arms may be lengthened or shortened by the actuation of a simple form of mechanical means in a short space of time.

A still further object of the invention resides in providing a safety factor in the operation of car end straighteners in that a truck support is always at hand and closely below the straightener even in its highest raised position whereby if it should topple from the jack it will only fall a very short distance and then onto the truck; a second safety factor being afforded by the standards of the elevating mechanism which laterally confine the compression arms from escaping from the truck in a lateral or horizontal direction; and thereby injuries to workmen are avoided.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of an improved adjusting truck constructed in accordance with the present invention with the car end straightener supported thereon in a position adjacent a railway car end;

Figure 2 is a side elevation of the same;

Figure 3 is a top plan view of the improved adjusting truck with the car end straightener removed;

Figure 4 is a vertical longitudinal section taken through the truck on the line 4—4 in Figure 3;

Figure 5 is a front elevation of the improved adjusting truck;

Figure 6 is a bottom plan view, taken on an enlarged scale, of the swinging elevating or hoisting mechanism;

Figure 7 is a side elevation of the same with a portion of the standard broken away;

Figure 8 is an end elevation of the hoisting device with the trunnion and standard partly broken away and partly shown in section;

Figure 9 is a horizontal section taken on the line 9—9 in Figure 4;

Figure 10 is a modified form of the block and tackle at the upper ends of the masts or standards;

Figure 11 is a side view, with parts broken away and parts shown in section of the two telescoping members of the compression arms with means for lengthing and shortening the same;

Figure 12 is a vertical transverse section taken on the line 12—12 in Figure 11;

Figure 13 is a fragmentary view of the two telescoping members of the compression arms, showing the slot for an associated gear wheel.

Referring more particularly to the drawings 39 designates the tension arm and 61 the two compression arms of the car end straightener device according to my aforesaid patent. The jacking head 42 of the straightener device carries universal sockets 84 in which the ball ends of the compression arms 61 are fitted for universal movement in both vertical and horizontal directions. The tension arm 39 is adapted to be coupled to the car coupler 34 of the freight car 32. A jack 47 is adapted to exert lifting power beneath the jacking head 42.

In accordance with the invention a truck is provided having a platform 20 serving as a support for the car straightener device. This truck has rear wheels 21 journaled upon an axle 22 which is secured to the rear portion of the platform 20 by a suitable under frame 23.

The front or steering wheels 24 are carried upon an axle 25 supported from the front under frame 26 through a fifth wheel 27 and a king bolt 28. This front swivel or steering truck is coupled to the tongue or shaft 29 by which the truck may be drawn along and steered.

The platform 20 carries front and rear cradles 30 and 31 to receive the tension arm 39 and to opposite sides of which are disposed the tension arms 61 when in the lowered position supported upon the platform 20.

The platform 20 near its rear portion is provided with lateral segmental extensions 62 having therein arcuate rows of perforations 33 over which is adapted to rotate a base plate 63. The base plate rotates upon a trunnion 35 having a perforation 36 therein as shown in Figures 7 and 8. This trunnion joins with a horizontal trunk 37 affixed to the upper portion of the base plate 63 and at its outer end a vertical tubular standard or mast 38 joins with the horizontal trunk 37. In fact the standard 38, trunk 37 and trunnion 35 may be all pieces of similar metallic tubing suitably cut and pieced together as indicated in Figure 7. Reinforcing webs 64 may be welded, brazed, soldered or otherwise affixed to the standard 38, trunk 37 and the base plate 63.

The platform 20 is formed with vertical openings 40 at substantially the center of the segmental extensions 62 and through these openings extend the trunnions 35 of the two elevating or hoist devices of which the swinging masts 38 form parts. Washers 41 are fitted about the trunnions 35 and against the lower side of the platform 20 while cotter pins 65 pass through the openings 36 and secure the washers 41 in place.

Stops 43 on the lateral segmental extensions 62 are disposed to engage the base plates 63 when the plates are in the position shown in Figure 3; that is when the masts 38 are at the outermost positions.

These masts 38 carry head or tackle blocks 44 in which pulleys 45 are mounted. Cables 46 are trained through the pulleys 45. An end of each cable is anchored, as indicated at 69, to a compression arm 61. The other end of each cable 46 is wound about a winch drum 48, shown more particularly in Figure 9. The drum 48 is fixed to rotate with a shaft 49 journaled in the side walls 50 and 51 of the winch attachment, such walls being welded upon opposite sides of the mast 38. A bridge piece 52 couples the outer ends of the walls 50 and 51 and reinforces the same. Affixed to rotate with the shaft 49 is a ratchet wheel 53 disposed to be engaged by a pawl 54. A crank handle 55 forms an extension of the shaft 49 through which the drum 48 may be manually rotated to wind in the cable 46.

A pin 56 is adapted to loosely fit in the perforation 72 in each base plate 63 and to line up with the arcuate series of perforations 33 in the lateral segmental extensions 62.

Referring more particularly to Figure 10 a modified form of the invention is shown in which 38ª indicates a standard having a double head or double tackle block 44ª with two sheaves 70 and 71 over which the cable 46ª is rove.

Referring more particularly to Figures 11 and 12, the extension inner telescopic member 68 of each compression arm 61 is formed with a series of axially spaced holes 57 stepped sufficiently far apart to be engaged by teeth 58 of a sprocket or gear wheel 59 journaled upon a shaft 60 in a gear case 66 which is welded or otherwise affixed to the outer compression member 61. A slot 73 in the outer member 61 and within the confines of the case 66 receives the teeth 58 of the gear wheel 59. This gear wheel 59 may be rotated manually by means of the hand crank 67.

In the use of the truck, the straightener occupies a position normally in which the center tension arm 39 occupies the two cradles 30 and 31 while the two compression arms 61 lie upon the platform 20 at opposite sides of the cradles. The length of the truck is so related to the length of the straightener that the compression and tension arms project from the truck both forwardly and rearwardly. The truck will be approximately of a height to carry the straightener at the necessary horizontal elevation for coupling to the work. For instance one end of the tension arm 39 is adapted to engage with the car coupler 34 and for this purpose the truck may be backed to the work as indicated in Figures 1 and 2 with the projecting free end of the tension arm 39 in position to engage the coupler 34. The forward end of the tension arm 39 will project outwardly beyond the truck, the front steering wheels of which may be turned sufficiently to one side in order to remove the tongue or shaft 29 from the position to be occupied by the lifting jack 47 which is thereupon applied in place as indicated in Figure 2. Next the crank handles 55 may be rotated in order to wind the cables 46 upon the drums 48 which act to lift the compression arms 61. It will be noted that the winch or windlass devices upon each mast are entirely independent of one another so that the free end of one compression arm 61 may be adjusted to one elevation while the free or operative end of the companion compression arm 61 is brought to a different elevation, either higher or lower. Either before or after the elevating operation, the two compression arms 61 may be adjusted laterally or horizontally, this being accomplished by first withdrawing the pins 57 from the holes 33 and 72 and rotating the masts upon the trunnions 35. When the base plates 63 are against the stops 43 the masts 38 are in their outermost positions. Such positions permit the two compression arms 61 to be spread horizontally an angular distance which corresponds in a general way to the width of the freight car, whereby the operative ends of the compression arms 61 may be brought to any desirable end zone of the car sheets. By rotating the plate 63 and masts 38 about the trunnions 35 such masts may be made to approach one another throughout a rather wide range of the angular movement of the base plate 63 about the trunnion center; and in this way the operative ends of the two compression arms 61 may be brought relatively close together to engage center portions of the car sheet. It will be noted that the two masts 38 are laterally adjustable entirely independently of one another, whereby the operative end of one compression arm may be engaged with the outer part of the car sheet while the operative end of its companion compression arm engages a center portion of the sheet and at the same or a different elevation. The pin 56 is dropped into the registering slots 72 and 33 when the base plate 63 has arrived at its desired angular position whereby the mast is locked into angular position to which it has been adjusted.

It will be noted particularly from Figures 1 and 2 that the two masts 38 constitute confining means for the compression arms 61 and at points intermediate the lengths of such arms 61 and at points remote from the engagement of the ball ends of the arms in the universal sockets 84 of the jacking head 42. Thus if the compression arms slip from the work or escape from the universal sockets 84, the masts 38 will encounter same and prevent these compression arms 61 from rolling off the sides of the truck where they would be apt to injure workmen.

The compression arms 61 are lowered by kicking out the pawls 54 from engagement with the ratchets 53 and thus paying out the cables 46 until the compression arms 61 rest upon the platform 20. In this position the compression arms are confined in one direction by the cradles 30 and 31 and on the other side by the masts 38.

It will be noted that the anchorage points 69 of the cables 46 are outwardly of the operating mechanism in cases 66. In other words the cases 66 are between the masts 38 and the anchorage points 69. In this way the handles 67 are free both of the masts and the cables. That run of the cable 46 which extends between the windlass and the sheave block 44 is substantially vertical while the other run of the cable which extends between the sheave 45 and the anchorage point 69 is diagonal so that the weight of the straightener as supported in the cables 46 will have a tendency to prevent the straightener from sliding rearwardly of the truck. In fact it will tend to induce the parts to slide forwardly so as to maintain the jacking head 42 upon the jack 47 and to prevent the straightener from walking off the jack. The angle at which the diagonal portion of cables 46 is disposed will be a minimum to satisfy this weight requirement and the requirement of removal from crank handles 67 in order that the lifting moment of this diagonal portion of the cable will be as nearly vertical as practicable.

The shaft 60 in Figures 11 and 12 will fit with a tight frictional fit in the case 66 or in the bearings of the case in order to prevent casual rotation of the gear wheels 59. The gear wheels will thus be frictionally held in the position to which they are turned or rotated in order that the inner members 68 of the compression arms may remain in the extended or retracted position to which they are adjusted.

It will be also noted that due to the mounting, the masts 38 wind rearwardly of the truck as they move inwardly. This tends to straighten to a more nearly vertical position the diagonal runs on the cables 46. In other words the sheave blocks 44 are brought nearer to the anchorage points 69. The windlasses and sheave blocks being both carried by the masts 38, this angular movement of the masts about the trunnion centers 35 will have no effect on the runs of the cables 46 extending between the windlasses and the sheave blocks 44.

It will be appreciated that two men may very readily pull the truck along with the car end straightener in place thereon and may easily back it into place as indicated in Figures 1 and 2. When on location the car end straightener, supported as it is by the truck, can be manipulated into operative position and actually operated by a single workman. The other workman may be employed with a sledge hammer in hammering upon the car sheet while it is undergoing bending in order to set the same and prevent its rebulging after the bending operation.

After the tension arm 39 is connected to the coupler 34 or to other part of the car and the free ends of the compression arms 61 applied to desired localized outwardly bulged areas of the car sheet 32, the jack 47 is raised by air or mechanical power and the two compression arms forced against the car sheet by this raising movement of the jacking head 42, all in accordance with the description of the operation contained in my patent aforesaid. During this movement the tension arm 39 will be lifted through only a short distance and should the straightener fall off the jack 47 it will be caught early in its fall by the truck and confined by the two masts 38 against rolling off the truck. In this way accidents and injuries to workmen are forestalled.

It is obvious that various changes and modifications may be made in the details of construction and design of the above specifically described embodiment of this invention without departing from the spirit thereof, such changes and modifications being restricted only by the scope of the following claims.

I claim:

1. For use with a car end straightener device embodying a tension arm, a jacking head connected thereto, and compression arms having universal movement in said jacking head, an adjusting and carrying truck comprising a wheeled platform adapted to receive and support said arms with the arms extending beyond the front and rear ends of the truck in position to be engaged with a car and by a jack, elevating means on the truck connected to said compression arms, and means whereby said elevating means is adjustable laterally of the truck.

2. For use with a car end straightener device embodying a tension arm, a jacking head connected thereto, and compression arms having universal movement in said jacking head, an adjusting and carrying truck comprising a wheeled platform on which said arms are adapted to rest with the arms extending beyond the front and rear end of the truck, cradles centrally of the platform for receiving said tension arm, elevating devices erected at the sides of the truck and connected to said compression arms, and means for adjusting said elevating devices laterally of the truck.

3. For use with a car end straightener device embodying a tension arm, a jacking head connected thereto, and compression arms having universal movement in said jacking head, an adjusting and carrying truck comprising a wheeled platform for receiving and supporting said arms with the arms extending beyond the front and rear ends of the truck, hoists for the compression arms at the sides of the truck, and swivel mountings for said hoists.

4. An adjusting and carrying truck as claimed in claim 3 characterized by the fact that latch means are provided to retain the hoists in angularly adjusted positions.

5. An adjusting and carrying truck according to claim 3 wherein perforated base plates of the hoists move over perforated portions of the platform and removable pins engage registering perforations to form a latch for holding the hoists in angularly adjusted positions.

6. An adjusting and carrying truck as claimed in claim 3 in which lateral segmental extensions of the platform receive thereon rotatable base plates of the hoists.

7. An adjusting and carrying truck as claimed in claim 3 in which trunnions of the hoists project into substantially vertical bearing openings of the platform, with means to retain the trunnions against upward escape from such openings.

8. For use with a car end straightener device embodying a tension arm, a jacking head thereon and compression arms having universal movement in said jacking head, an adjusting and carrying truck comprising a wheeled platform for supporting said arms with the arms extending beyond the front and rear ends of said truck, said arms having lateral segmental extensions, said platform having bearing openings at substantially the centers of said segmental extensions, base plates rotatable on said segmental extensions, trunnions on the inner portions of said base plates fitted to rotate in said bearing openings, masts carried by the outer portions of said base plates and elevating mechanism on said masts connected to said compression arms.

9. An adjusting and carrying truck as claimed in claim 8, further comprising trunks connected to said base plates and connecting said trunnions and masts.

10. An adjusting and carrying truck according to claim 8 characterized by the fact that said segmental extensions have arcuate series of spaced perforations adapted to selectively register with perforations of said base plate, and a removable headed pin adapted to engage registering perforations to form a latch.

11. For use with a car end straightener device embodying a tension arm, a jacking head thereon, and compression arms having universal movement in said jacking head, an adjusting and carrying truck comprising a wheeled platform for supporting said arms with the arms extending beyond the front and rear ends of the truck, masts adjustably mounted on said platform for movement toward and from one another, and elevating mechanism carried by said masts and connected to said compression arms.

12. An adjusting and carrying truck as claimed in claim 11 in which said elevating mechanism comprises sheave blocks at the upper portions of said masts, windlasses on said masts, and cables extending from said windlasses over the sheaves and to said compression arms.

13. For use with a car end straightener device embodying a tension arm, a jacking head connected thereto, and compression arms having universal movement in said jacking head, an adjusting and carrying truck comprising a platform for receiving and supporting said arms with the arms extending beyond the front and rear ends of the truck, rear wheels for supporting said platform, a rigid underframe for said rear wheels connected to said platform, front steering wheels, a front rigid underframe on the truck to which said front wheels are swivelly connected, a tongue connected to said front wheels and swivelling therewith, and means on said platform for orienting the arms in the support of the arms on the platform.

14. For use with a car end straightener embodying tension and compression arms and a jacking head with which the compression arms have universal movement, said compression arms composed of telescopic extensible sections, and operating mechanism for extending and retracting said sections, an adjusting and carrying truck comprising a wheeled platform adapted to receive and support said arms with the arms extending beyond the front and rear ends of the truck, hoist masts erected at the sides of the platform, windlasses carried by said masts, and cables connected to said windlasses and to points on the compression arms outwardly of said operating devices.

15. In combination a wheeled truck having a platform, hoist masts at the sides of the platform, windlass devices carried by the truck, windlass cables connected to said windlasses and rove through parts of the masts, a tension arm carried centrally by said truck, means on the truck to orient said arm, a jacking head carried by said arm, compression arms universally mounted in said jacking head and comprising inner and outer telescopic members, said inner members having spaced holes therein, a gear wheel having teeth adapted to engage said holes, a case for said gear wheel affixed to the outer member of said compression arms, means for frictionally holding said gear wheels against rotation in said case, means for rotating said gear wheels, said gear wheels and gear cases being spaced rearwardly from said hoist masts, said cables anchored to the outer members of said compression arms outwardly of said gear cases.

POSY G. STULTZ.

REFERENCES CITED

The following references are of record in the file of this patent:

UNITED STATES PATENTS

| Number | Name | Date |
|---|---|---|
| 1,749,806 | Fisher | Mar. 11, 1930 |
| 2,000,572 | Smith | May 7, 1935 |
| 2,371,659 | Stultz | Mar. 20, 1945 |